(12) United States Patent
Lee et al.

(10) Patent No.: US 11,368,075 B2
(45) Date of Patent: Jun. 21, 2022

(54) STATOR COIL WINDING MACHINE

(71) Applicant: RAINBOW ROBOTICS, Daejeon (KR)

(72) Inventors: Jung Ho Lee, Daejeon (KR); Jung Woo Heo, Daejeon (KR); Jeong Soo Lim, Daejeon (KR); Chan Ho Park, Daejeon (KR); Tae June Kim, Daejeon (KR)

(73) Assignee: RAINBOW ROBOTICS, Daejeon (KR)

( * ) Notice: Subject to any disclaimer, the term of this patent is extended or adjusted under 35 U.S.C. 154(b) by 0 days.

(21) Appl. No.: 15/734,437

(22) PCT Filed: Apr. 14, 2020

(86) PCT No.: PCT/KR2020/005025
§ 371 (c)(1),
(2) Date: Dec. 2, 2020

(87) PCT Pub. No.: WO2020/213918
PCT Pub. Date: Oct. 22, 2020

(65) Prior Publication Data
US 2021/0226517 A1    Jul. 22, 2021

(30) Foreign Application Priority Data

Apr. 16, 2019  (KR) .......................... 10-2019-0044067
Apr. 16, 2019  (KR) .......................... 10-2019-0044068
Apr. 16, 2019  (KR) .......................... 10-2019-0044071

(51) Int. Cl.
*B23P 19/04*      (2006.01)
*H02K 15/06*   (2006.01)

(52) U.S. Cl.
CPC .................................. *H02K 15/06* (2013.01)

(58) Field of Classification Search
CPC ......... H02K 15/06; H02K 15/095; H02K 3/28
See application file for complete search history.

(56) References Cited

U.S. PATENT DOCUMENTS 5,864,940 A * 2/1999 Takahata ............ H02K 15/0442
                                                      29/596
6,628,034 B2 * 9/2003 Jang ....................... H02K 21/16
                                                      310/210

FOREIGN PATENT DOCUMENTS

| EP | 0553898 A2 | 8/1993 |
| JP | 03-220706 A | 9/1991 |
| JP | 08-236382 A | 9/1996 |
| JP | 10-191601 A | 7/1998 |
| JP | 10-271774 A | 10/1998 |

(Continued)

*Primary Examiner* — Paul D Kim
(74) *Attorney, Agent, or Firm* — Novick, Kim & Lee, PLLC; Sang Ho Lee; Hyun Woo Shin

(57) ABSTRACT

Provided is a stator coil winding machine including: a stator transfer unit adapted to transfer a linear type stator having a plurality of stator cores in directions of X and Y axes; a winding guide unit adapted to guide the transferred stator to coil winding; a winding unit adapted to wind a coil on the stator; a tension adjusting unit adapted to adjust tension on the coil being wound on the stator; and a controller adapted to control operations of the stator transfer unit, the winding guide unit, and the winding unit to allow the coil to be wound on the stator by means of three-phase Y connection on the basis of a previously set winding sequence.

22 Claims, 12 Drawing Sheets

(56) References Cited

FOREIGN PATENT DOCUMENTS

| JP | 2001-298919 A | 10/2001 |
|----|---------------|---------|
| JP | 2011-030309 A | 2/2011  |

* cited by examiner

STATOR COIL WINDING MACHINE

TECHNICAL FIELD

The present invention relates to a stator coil winding machine, and more particularly, to a stator coil winding machine that is capable of winding a coil on a stator used for a brushless DC (BLDC) motor.

BACKGROUND ART

A typical DC motor is widely used with some advantages such as economic effects, easiness in controlling speed and in designing a simple structure, and so on, in spite of some disadvantages such as generation of vibrations and noise due to mechanical contacts between a commutator and a brush, generation of dust due to abrasion of brush, limited life term of brush, and so on.

As the technology related to a BLDC motor has been developed, recently, problems occurring in manufacturing a controller and a core become suppressed, and accordingly, it is possible to gently control the speed of the BLDC motor. Further, it is possible to produce the BLDC motor having excellent efficiencies over a large range of variable speed.

Accordingly, the DC motor has been replaced with the BLDC motor in various fields like a compressor motor for a refrigerator or air conditioner, a driving motor for a front-loading washing machine, a cellular phone, and so on.

Particularly, a wireless information device like a cellular phone requires a motor which is simple in structure and has a long life term, low noise, and high reliability, and accordingly, an inner rotor BLDC motor where a rotor is located on the inner side thereof is widely used for automatic functions like automatic folder and camera driving functions for the cellular phone.

By the way, the conventional BLDC motor is difficult to wind a coil on a ring type stator core, and further, it is hard to manufacture a coil winding jig. Undesirably, accordingly, a space in the BLDC motor is not efficiently utilized, an amount of coil wound is not sufficient, and excellent characteristics of the BLDC motor are not obtained.

DISCLOSURE

Technical Problem

Accordingly, the present invention has been made to solve the above-mentioned problems, and it is an object of the present invention to provide a stator coil winding machine that is capable of easily winding a coil on stator cores constituting a stator used for a BLDC motor.

Technical Solution

To accomplish the above-mentioned objects, according to one aspect of the present invention, there is provided a stator coil winding machine including: a stator transfer unit adapted to transfer a linear type stator having a plurality of stator cores in directions of X and Y axes; a winding guide unit adapted to guide the transferred stator to coil winding; a winding unit adapted to wind a coil on the stator; a tension adjusting unit adapted to adjust tension on the coil being wound on the stator; and a controller adapted to control operations of the stator transfer unit, the winding guide unit, and the winding unit to allow the coil to be wound on the stator by means of three-phase Y connection on the basis of a previously set winding sequence, wherein the winding sequence includes coil winding order of the plurality of stator cores and coil winding directions thereof, and if numbers are applied sequentially to the plurality of stator cores in a direction of a right side of the plurality of stator cores from the left side thereof, the order of coil winding on the plurality of stator cores is different from the numbers of the plurality of stator cores, the plurality of stator cores being divided into three sets so that the coil is wound thereon by means of the three-phase Y connection.

The stator includes 12 stator cores, and the winding sequence is carried out as follows: if the numbers are applied sequentially to the plurality of stator cores in the direction of the right side of the plurality of stator cores from the left side thereof, the coil winding order of the first stator core is the second and the coil winding direction thereof is a counterclockwise direction; the coil winding order of the second stator core is the first and the coil winding direction thereof is a clockwise direction; the coil winding order of the third stator core is the twelfth and the coil winding direction thereof is the counterclockwise direction; the coil winding order of the fourth stator core is the eleventh and the coil winding direction thereof is the clockwise direction; the coil winding order of the fifth stator core is the seventh and the coil winding direction thereof is the clockwise direction; the coil winding order of the sixth stator core is the eighth and the coil winding direction thereof is the counterclockwise direction; the coil winding order of the seventh stator core is the fourth and the coil winding direction thereof is the clockwise direction; the coil winding order of the eighth stator core is the third and the coil winding direction thereof is the counterclockwise direction; the coil winding order of the ninth stator core is the tenth and the coil winding direction thereof is the clockwise direction; the coil winding order of the tenth stator core is the ninth and the coil winding direction thereof is the counterclockwise direction; the coil winding order of the eleventh stator core is the fifth and the coil winding direction thereof is the counterclockwise direction; and the coil winding order of the twelfth stator core is the sixth and the coil winding direction thereof is the clockwise direction.

In the three-phase Y connection, the first phase is made by the connection of the first stator core, the second stator core, the seventh stator core, and the eighth stator core, the second phase is made by the connection of the third stator core, the fourth stator core, the ninth stator core, and the tenth stator core, and the third phase is made by the connection of the fifth stator core, the sixth stator core, the eleventh stator core, and the twelfth stator core.

If the coil winding on the plurality of stator cores is finished, the stator is transformed into a ring type stator and is thus applied to a BLDC motor adopting the three-phase Y connection.

The controller operates the stator transfer unit to transfer the stator to a coil winding region, controls the guide operation of the winding guide unit, and controls the coil winding on the plurality of stator cores by means of the winding unit.

After the coil winding on the stator is finished, the controller controls the stator transfer unit, the winding guide unit, and the winding unit to return the stator to an initial position thereof.

To accomplish the above-mentioned objects, according to another aspect of the present invention, there is provided a stator coil winding machine including: a stator transfer unit adapted to transfer a linear type stator having a plurality of stator cores in directions of X and Y axes; a winding guide unit adapted to guide the transferred stator to coil winding;

a winding unit adapted to wind a coil on the stator; a tension adjusting unit adapted to adjust tension on the coil being wound on the stator; and a controller adapted to control operations of the stator transfer unit, the winding guide unit, and the winding unit to allow the coil to be wound on the stator by means of three-phase Y connection on the basis of a previously set winding sequence, wherein the stator transfer unit includes: an X axis controlling screw located on a fixed frame in the direction of the X axis; an X axis controlling guide spaced apart from the X axis controlling screw on the fixed frame in the direction of the X axis; an X axis moving member located on the underside of a moving frame spaced apart from top of the fixed frame in such a manner as to move in the direction of the X axis along the X axis controlling guide to allow the X axis controlling screw to be rotatably engagingly passed therethrough; a Y axis controlling screw located on top of the moving frame in the direction of the Y axis from the X axis controlling screw; a Y axis controlling guide spaced apart from the Y axis controlling screw on the moving frame; a Y axis moving member moving in the direction of the Y axis along the Y axis controlling guide in such a manner as to allow the Y axis controlling screw to be rotatably engagingly passed therethrough; and a stator fixing part coupled to top of the Y axis moving member in such a manner as to fix the stator thereto.

One end of the X axis controlling screw is rotatably press-fitted to a first support located on the fixed frame, and the other end thereof is rotatably press-fitted to the X axis moving member in such a manner as to pass through the X axis moving member.

One end of the X axis controlling screw is connected to a first pulley, the first pulley is connected to a second pulley by means of a rubber belt, and the second pulley is connected to a motor shaft of a first motor.

One end of the Y axis controlling screw is rotatably press-fitted to a second support located on the moving frame, and the other end thereof is rotatably press-fitted to a third support located on the moving frame.

One end of the Y axis controlling screw is connected to a third pulley, the third pulley is connected to a fourth pulley by means of a rubber belt, and the fourth pulley is connected to a motor shaft of a second motor.

The stator fixing part includes: a plurality of magnet modules located serially in the direction of the Y axis on a plate coupled to top of the Y axis moving member in such a manner as to operate to a stator locking state for fixing the stator thereto and to a stator unlocking state for releasing the fixed state to the stator; and handles located on tops of the magnet modules in such a manner as to rotate the magnet modules to a given angle.

The magnet modules have magnets built therein.

If the handles rotate in one direction to allow the magnetic forces on the surfaces of the magnet modules facing the stator to be turned on, the magnet modules operate to the stator locking state.

If the handles rotate in the opposite direction to one direction to allow the magnetic forces on the surfaces of the magnet modules facing the stator to be turned off, the magnet modules operate to the stator unlocking state.

The stator fixing part has coil fixing members located on the back and underside thereof to fix the coil thereto.

To accomplish the above-mentioned objects, according to yet another aspect of the present invention, there is provided a stator coil winding machine including: a stator transfer unit adapted to transfer a linear type stator having a plurality of stator cores in directions of X and Y axes; a winding guide unit adapted to guide the transferred stator to coil winding; a winding unit adapted to wind a coil on the stator; a tension adjusting unit adapted to adjust tension on the coil being wound on the stator; and a controller adapted to control operations of the stator transfer unit, the winding guide unit, and the winding unit to allow the coil to be wound on the stator by means of three-phase Y connection on the basis of a previously set winding sequence, wherein the tension adjusting unit includes: a friction part adapted to continuously apply friction to the coil drawn from a bobbin; and a tension maintaining part adapted to tighten the tension on the coil instantly released upon the coil winding to allow the tension on the coil to be kept.

The friction part includes: two rubber cylinders coming into surface contact with each other; two plastic plates coming into close contact with one surface of the two rubber cylinders, respectively, while passing the coil through a space therebetween; and an adjusting member for adjusting a tension value on the coil.

The adjusting member is constituted of a bolt.

The tension maintaining part includes: a torsion spring spaced apart from the friction part by a given distance; a lever connected to the torsion spring; and first and second idlers located on both ends of the lever, respectively.

The tension maintaining part is located on one end of a support fixed to the fixed frame on which the tension adjusting unit is located and has a third idler located on the other end of the support in such a manner as to induce the coil on which the tension is maintained to the winding unit.

The coil drawn from the bobbin passes through the space between the two plastic plates of the friction part, moves to the first and second idlers, and enters the winding unit via the third idler.

Advantageous Effects

According to the present invention, the stator coil winding machine makes use of the stator having the plurality of stator cores (for example, 12 stator cores) arranged linearly, thereby allowing the coil having a diameter of 1 mm or more (for example, 1.1 mm) to be easily wound on the stator.

In addition, the stator coil winding machine according to the present invention can change the number of coil winding times or the thickness of the coil according to desired speed and torque.

Further, the stator coil winding machine according to the present invention can change only the stator fixing part according to a kind of stator, thereby winding the coil on various kinds of stators.

MODE FOR INVENTION

Figure 1:
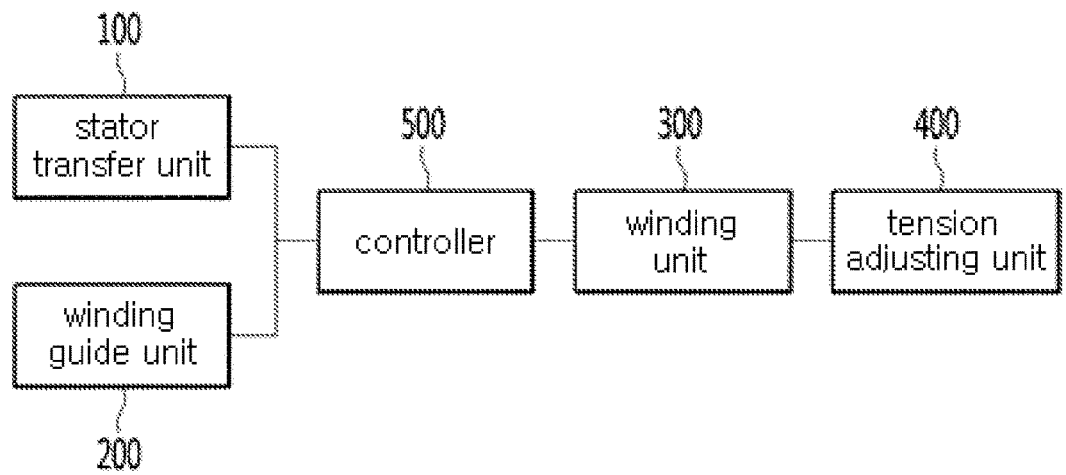
FIG. 1 is a block diagram showing a stator coil winding machine according to the present invention.

Hereinafter, an explanation on a stator coil winding machine according to the present invention will be given in detail with reference to the attached drawings.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Terms, such as the first, and the second, may be used to describe various elements, but the elements should not be restricted by the terms. The terms are used to only distinguish one element from the other element. For example, a first element may be named a second element without departing from the scope of the present invention. Likewise, a second element may be named a first element.

A term 'and/or' includes a combination of a plurality of relevant and described items or any one of a plurality of related and described items.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements.

Terms used in this application are used to only describe specific exemplary embodiments and are not intended to restrict the present invention. An expression referencing a singular value additionally refers to a corresponding expression of the plural number, unless explicitly limited otherwise by the context.

In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

In the description, the embodiment of the present invention is understood more perfectly to an ordinary person in the art, the shapes and sizes of the components shown in the drawing may be magnified for the clarity and convenience of the description.

Figure 2:
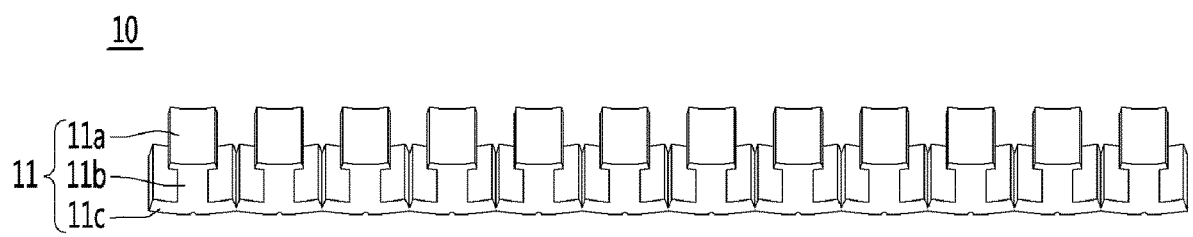
FIG. 2 is a perspective view showing a stator adopted in the stator coil winding machine according to the present invention.
Figure 3:
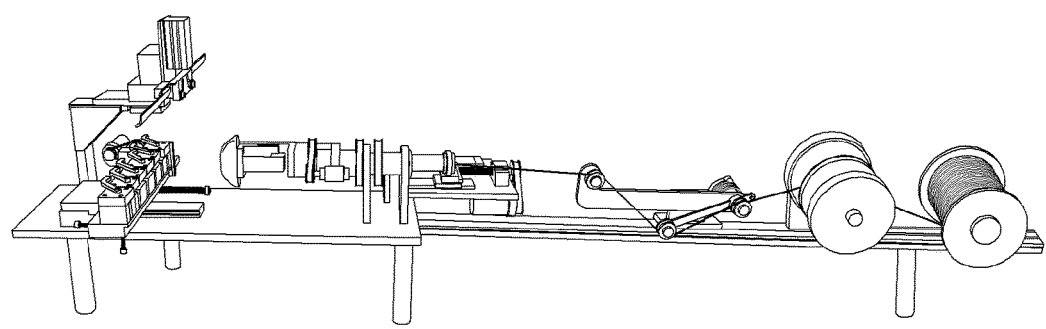
FIG. 3 is a perspective view showing the whole configuration of the stator coil winding machine according to the present invention.

FIG. 1 is a block diagram showing a stator coil winding machine according to the present invention, FIG. 2 is a perspective view showing a stator adopted in the stator coil winding machine according to the present invention, and FIG. 3 is a perspective view showing the whole configuration of the stator coil winding machine according to the present invention.

A stator coil winding machine according to the present invention is a winding machine for producing a BLDC motor (which adopts three-phase Y connection) used for a collaborative robot developed by the same applicant as this invention.

The stator coil winding machine according to the present invention includes a stator transfer unit 100, a winding guide unit 200, a winding unit 300, a tension adjusting unit 400, and a controller 500.

The stator transfer unit 100 serves to transfer a stator 10 in which a plurality of stator cores 11 (for example, 12 stator cores 11 in the present invention) is arranged serially in directions of X and Y axes.

The stator transfer unit 100 transfers the stator 10 to a coil winding region or allows the stator 10 to escape from the coil winding region.

In this case, each stator core 11 takes a shape of H having an inner frame 11a, a coil winding portion 11b, and an outer frame 11c. The inner frame 11a and the outer frame 11c are arranged parallel to each other, while placing the coil winding portion 11b therebetween, and a width of the inner frame 11a is shorter than a width of the outer frame 11c. A coil (for example, a copper wire coated with enamel) is wound on the coil winding portion 11b, and in this case, the coil is wound around the coil winding portion 11b by means of the winding unit 300 for leading the coil introduced from the outside.

After the coil is wound on all of the 12 stator cores 11, the linear type stator 10 is changed to a ring type stator 10 by means of a jig (not shown) separately provided. The ring type stator 10 will be applied to the BLDC motor adopting the three-phase Y connection.

It is impossible to wind a relatively thick copper wire having a diameter of about 1 mm or more on the existing ring (or circular) type stator, but according to the present invention, if the linear type stator 10 is used, a copper wire having a diameter of about 0.6 or 1.1 mm can be easily wound on the linear type stator 10.

According to the present invention, a three-layered coil is wound on each stator core 11. In this case, the coil is wound seven times on the first and second layers, respectively, and the coil on the third layer is wound once. In this case, a winding sequence of the stator 10 is previously set in the controller 500. An explanation on the winding sequence of the stator 10 will be given later.

On the other hand, the number of coil winding times or the thickness of the coil may be changed according to desired speed and torque.

The winding guide unit 200 serves to guide the stator 10 transferred to the coil winding region by means of the stator transfer unit 100 to allow the coil to be more gently wound on the stator 10.

The winding unit 300 serves to wind the coil on the stator 10 transferred to the coil winding region by means of the stator transfer unit 100. In this case, coil winding is carried out according to the previously set winding sequence of the stator 10.

The tension adjusting unit 400 serves to adjust tension on the coil being wound on the stator 10.

The controller 500 serves to control all of operations of the stator transfer unit 100, the winding guide unit 200 and the winding unit 300 to allow the coil to be wound on the stator 10 by means of the three-phase Y connection on the basis of the previously set winding sequence of the stator 10.

In detail, the controller 500 operates the stator transfer unit 100 to transfer the stator 10 (inclusive of the plurality of stator cores 11) to the coil winding region, controls the guide operation of the winding guide unit 200, and controls the winding unit 300 to allow the coil winding on the stator cores 11 to be gently performed by means of the three-phase Y connection.

After the coil winding on the stator 10 is finished, further, the controller 500 controls the stator transfer unit 100, the winding guide unit 200, and the winding unit 300 to return the stator 10 to its initial position.

Figure 4:
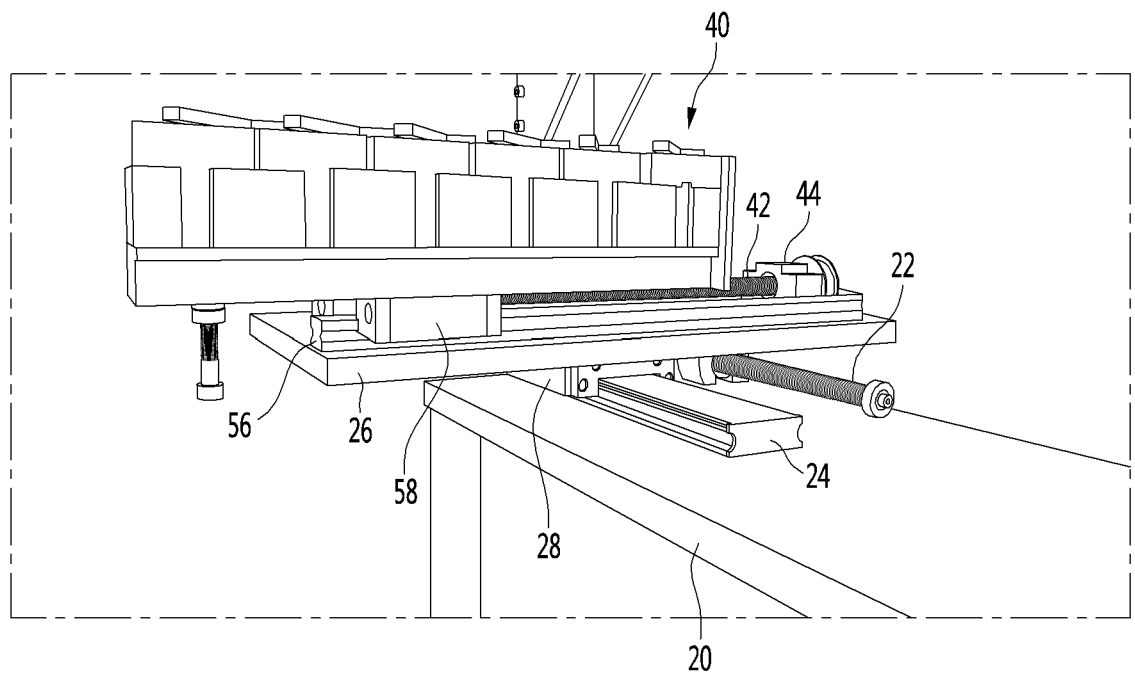
FIGS. 4 and 5 are perspective views showing a stator transfer unit of the stator coil winding machine according to the present invention.
Figure 5:
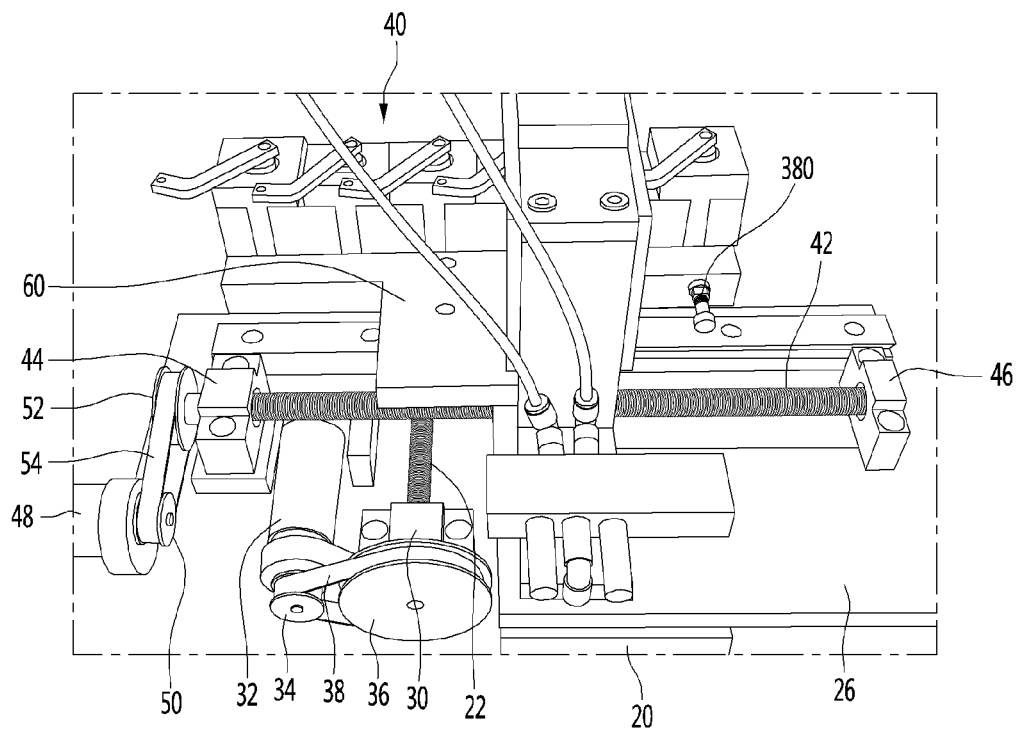
Figure 6:
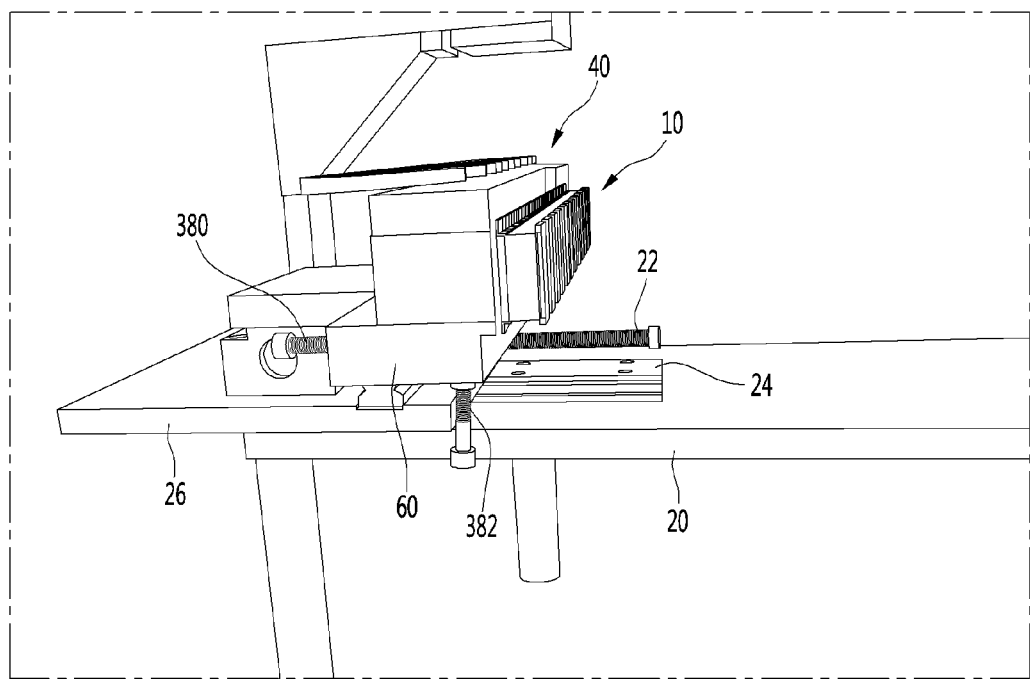
FIGS. 6 and 7 are perspective views showing a state where the stator is mounted on the stator transfer unit and is thus transferred in a direction of an X axis.
Figure 7:
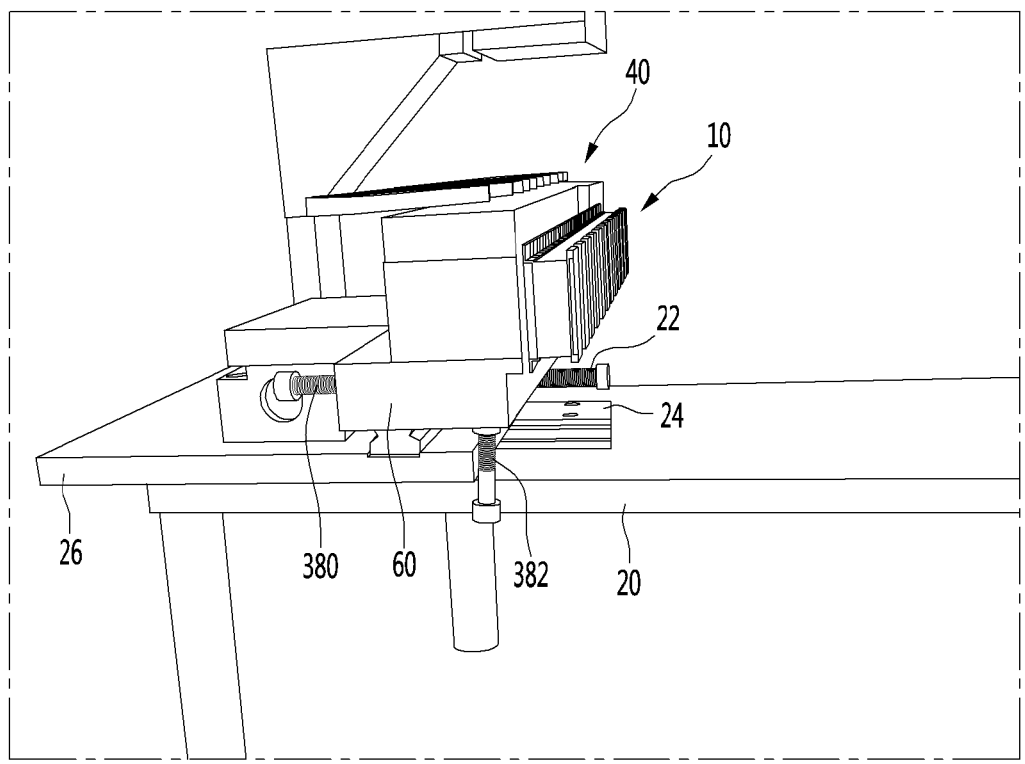
Figure 8:
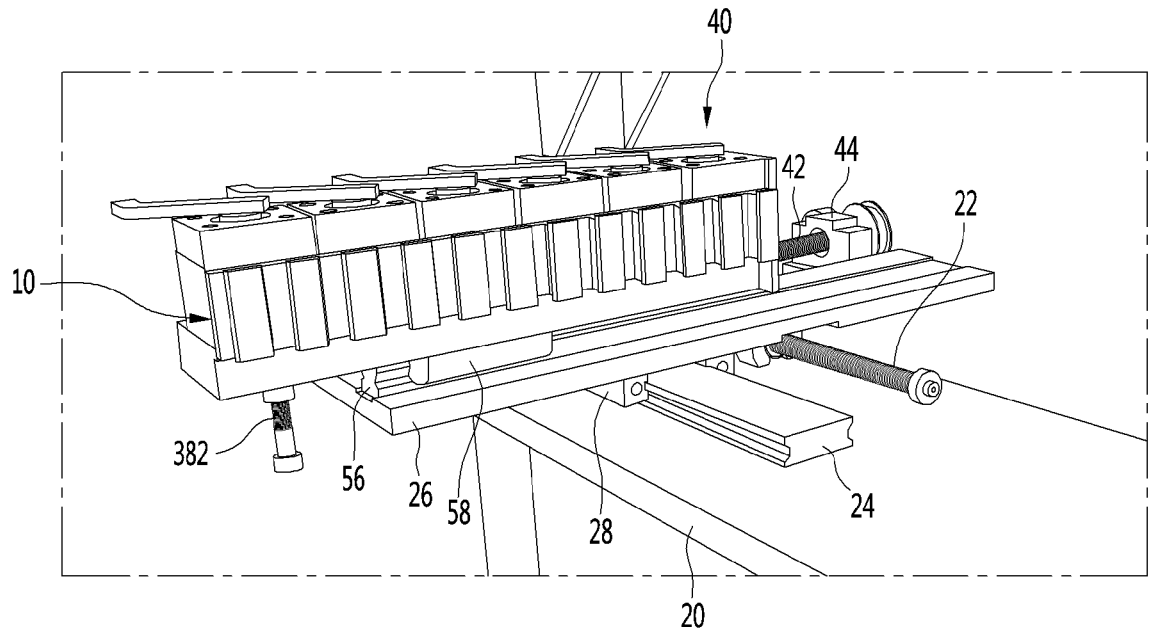
FIGS. 8 and 9 are perspective views showing a state where the stator is mounted on the stator transfer unit and is thus transferred in a direction of a Y axis.
Figure 9:
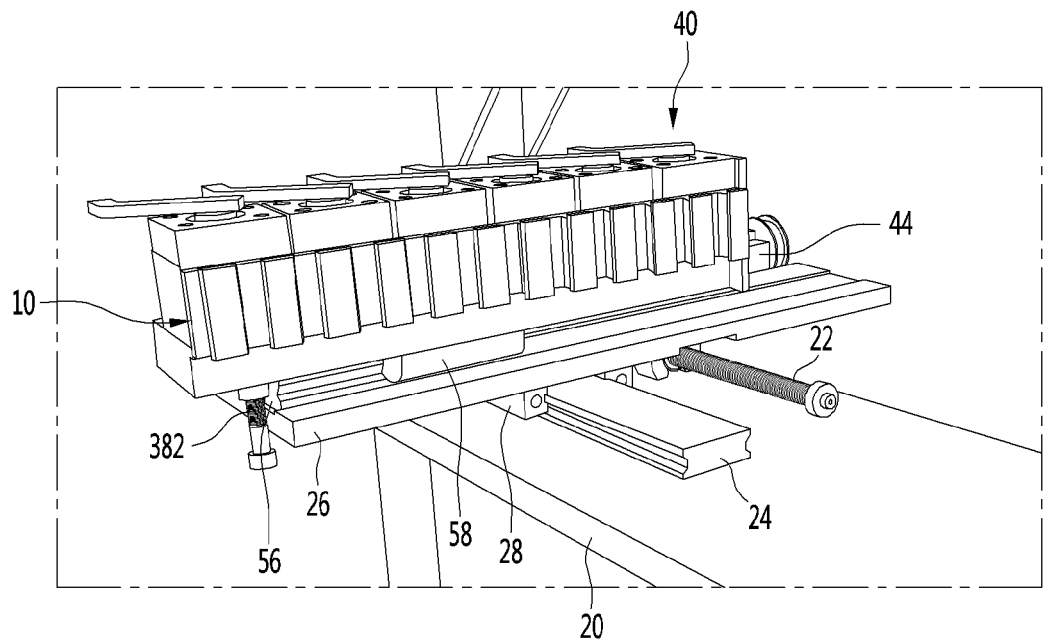

FIGS. 4 and 5 are perspective views showing the stator transfer unit of the stator coil winding machine according to the present invention, FIGS. 6 and 7 are perspective views showing a state where the stator is mounted on the stator transfer unit and is thus transferred in a direction of an X axis, and FIGS. 8 and 9 are perspective views showing a state where the stator is mounted on the stator transfer unit and is thus transferred in a direction of a Y axis.

The stator transfer unit 100 includes an X axis controlling screw 22 located on a fixed frame 20 in a longitudinal direction (in a direction of an X axis) of the fixed frame 20, an X axis controlling guide 24 spaced apart from the X axis controlling screw 22 by a given distance on the fixed frame 20 in the longitudinal direction (in the direction of the X axis), an X axis moving member 28 located on the underside of a plate-shaped moving frame 26 spaced apart from top of the fixed frame 20 in such a manner as to move in the longitudinal direction along the X axis controlling guide 24 to allow the X axis controlling screw 22 to be rotatably engagingly passed therethrough, a Y axis controlling screw 42 located on top of the moving frame 26 in a different direction (in a direction of a Y axis) from the X axis controlling screw 22, a Y axis controlling guide 56 spaced apart from the Y axis controlling screw 42 by a given distance on the moving frame 26, a Y axis moving member 58 moving in the direction of the Y axis along the Y axis controlling guide 56 in such a manner as to allow the Y axis controlling screw 42 to be rotatably engagingly passed therethrough, and a stator fixing part 40 coupled to top of the Y axis moving member 58 to fix the stator 10 thereto. An underside of a plate 60 of the stator fixing part 40 is coupled to top of the Y axis moving member 58.

One end of the X axis controlling screw 22 is rotatably press-fitted to a first support 30 located on the fixed frame 20, and the other end thereof is rotatably press-fitted to the X axis moving member 28 in such a manner as to pass through the X axis moving member 28.

Further, one end of the X axis controlling screw 22 is connected to a first pulley 36, and the first pulley 36 is connected to a second pulley 34 by means of a rubber belt 38. The second pulley 34 is connected to a motor shaft of a first motor 32. The first motor 32 rotates the X axis controlling screw 22. The X axis controlling guide 24 serves to hold a moving direction upon the rotation of the X axis controlling screw 22, thereby preventing the twist of the X axis controlling screw 22.

One end of the Y axis controlling screw 42 is rotatably press-fitted to a second support 44 located on the moving frame 26, and the other end thereof is rotatably press-fitted to a third support 46 located on the moving frame 26.

Further, one end of the Y axis controlling screw 42 is connected to a third pulley 52, and the third pulley 52 is connected to a fourth pulley 50 by means of a rubber belt 54. The fourth pulley 50 is connected to a motor shaft of a second motor 48. The second motor 48 rotates the Y axis controlling screw 42. The Y axis controlling guide 56 serves to hold a moving direction upon the rotation of the Y axis controlling screw 42, thereby preventing the twist of the Y axis controlling screw 42.

Reference numerals 380 and 382, which are not explained yet in FIGS. 4 to 9, are coil fixing members for fixing the coil. The coil fixing member 380 is located on the back of the plate 60 of the stator fixing part 40, and the coil fixing member 382 on the underside of the plate 60 of the stator fixing part 40. If necessary, only one of the two coil fixing members 380 and 382 may be provided. Functions of the coil fixing members 380 and 382 will be in detail explained in detailed description on the winding unit 300 as will be discussed later.

The stator transfer unit 100 with the above-mentioned configuration operates if the stator 10 is fixed to the stator fixing part 40. If the stator transfer unit 100 operates, the stator 10 moves to the X and Y axes and is thus transferred to the coil winding region. According to the present invention, the coil winding region is a region where the coil can be wound on the stator cores 11 of the stator 10. At an initial state, the stator 10 and the winding unit 300 are spaced apart from each other so that the coil cannot be wound on the stator 10. So as to allow the coil to be wound on the stator 10, accordingly, a distance between the stator 10 and the winding unit 300 has to be short. To start coil winding, first, the stator transfer unit 100 operates to allow the stator 10 to move to the X and Y axes until the distance between the stator 10 and the winding unit 300 is substantially reduced.

If the stator 10 moves to the X axis, while being transferred to the coil winding region, the X axis movement of the stator 10 is carried out by means of the X axis controlling screw 22, the X axis controlling guide 24, and the X axis moving member 28. FIG. 6 shows a state wherein the stator 10 is in an initial position before it moves in the direction of the X axis, and FIG. 7 shows a state wherein the stator 10 moves in the direction of the X axis by a given distance.

Contrarily, if the stator 10 moves to the Y axis, while being transferred to the coil winding region, the Y axis movement of the stator 10 is carried out by means of the Y axis controlling screw 42, the Y axis controlling guide 56, and the Y axis moving member 58. FIG. 8 shows a state of the stator 10 before the movement in the direction of the Y axis, and FIG. 9 shows a state wherein the stator 10 moves in the direction of the Y axis by a given distance.

According to the present invention, the movement in the direction of the Y axis is carried out after the movement in the direction of the X axis, but if necessary, the movement in the direction of the X axis may be carried out after the movement in the direction of the Y axis. Otherwise, the movement in the direction of the X axis and the movement in the direction of the Y axis may be simultaneously carried out.

Also, coils are not wound on the 12 stator cores 11, respectively, at a time, but the coil is wound on the stator cores 11 in order according to the previously set winding sequence. After the stator 10 reaches the coil winding region by means of the stator transfer unit 100, accordingly, the stator 10 moves to the Y axis until the coil winding is finished.

After that, if the coil winding on the stator 10 is finished, the stator transfer unit 100 operates in the opposite order to the above-mentioned order so that it is returned to its original position (that is, its initial position).

Figure 10:
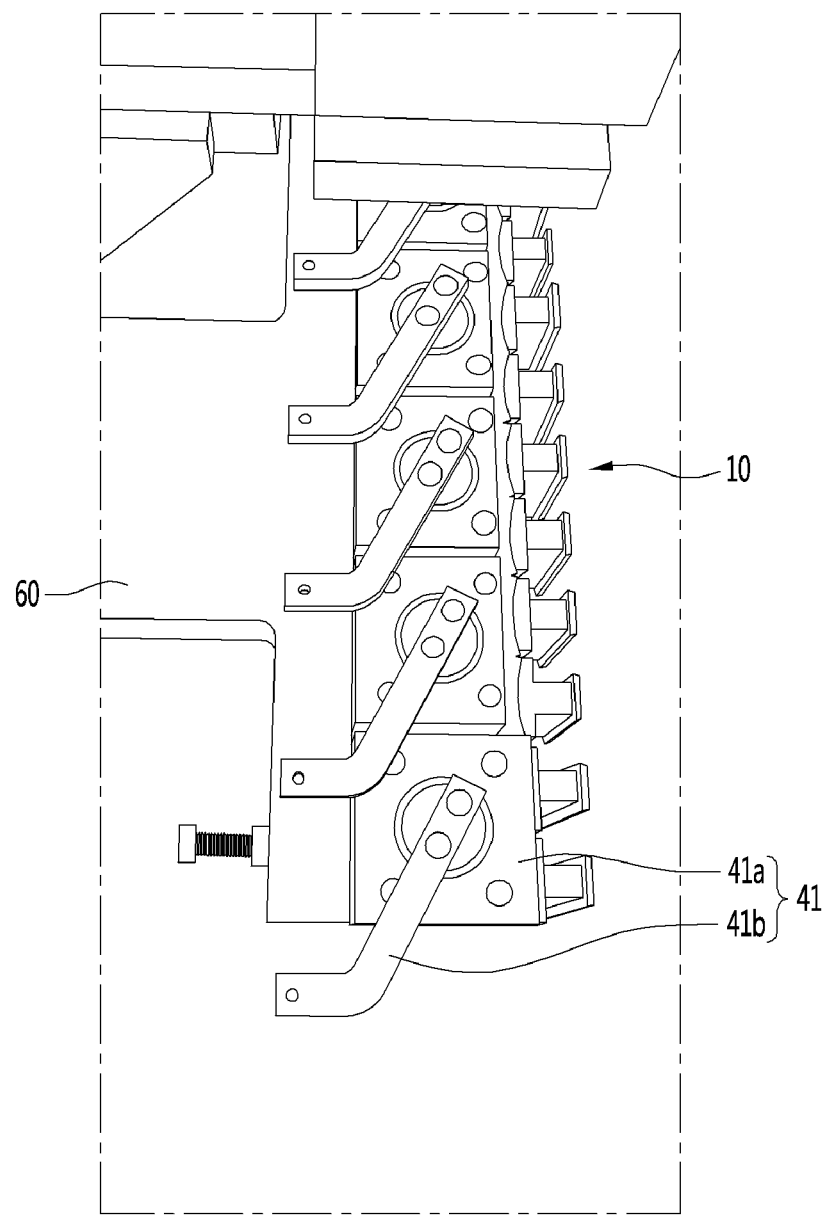
FIG. 10 is a perspective view showing a configuration and an operation of a stator fixing part in the stator transfer unit.

FIG. 10 is a perspective view showing a configuration and an operation of the stator fixing part in the stator transfer unit.

The stator fixing part 40 adopts a magnetic base operation in such a manner as to fix the stator 10 thereto by means of magnets.

The stator fixing part 40 includes a plurality of magnet modules 41a located serially (that is, in the direction of the Y axis) on the plate 60 coupled to top of the Y axis moving member 58 in such a manner as to operate to a stator locking state for fixing the stator 10 thereto and to a stator unlocking state for releasing the fixed state to the stator 10 and handles 41b located on tops of the magnet modules 41a in such a manner as to rotate the magnet modules 41a to an angle of 90°.

The magnet modules 41a have magnets (not shown) built therein to fix the stator 10 thereto.

In detail, if the handles 41b operate to rotate the magnet modules 41a to the angle of 90°, the poles of the magnets in the magnet modules 41a rotate, thereby turning on/off the magnetic forces on the sides of the magnet modules 41a.

If the handles 41b rotate in one direction to allow the magnetic forces of the sides (that is, the surfaces facing the stator 10) of the magnet modules 41a to be turned on, the facing surfaces between the stator 10 and the magnet modules 41a are coupled to each other by means of the magnetic forces, thereby causing the stator locking state (See FIG. 10). Contrarily, if the handles 41b rotate in a different direction (which is opposite to one direction by an angle of 90°) to allow the magnetic forces of the sides (that is, the surfaces facing the stator 10) of the magnet modules 41a to be turned off, the stator 10 becomes distant from the magnet modules 41a, thereby causing the stator unlocking state.

In detail, if the handles 41b located on the magnetic modules 41a are located at the positions as shown in FIG. 3, the stator unlocking state is provided, and accordingly, the stator fixing part 40 cannot fix the stator 10 thereto. If the handles 41b rotate in the opposite direction to the positions as shown in FIG. 3, they are located at the positions as shown in FIG. 10, so that the magnetic forces of the sides (that is, the surfaces facing the stator 10) of the magnet modules 41a are turned on to allow the stator 10 and the magnet modules 41a to be coupled to each other by means of the magnetic forces.

Figure 11:
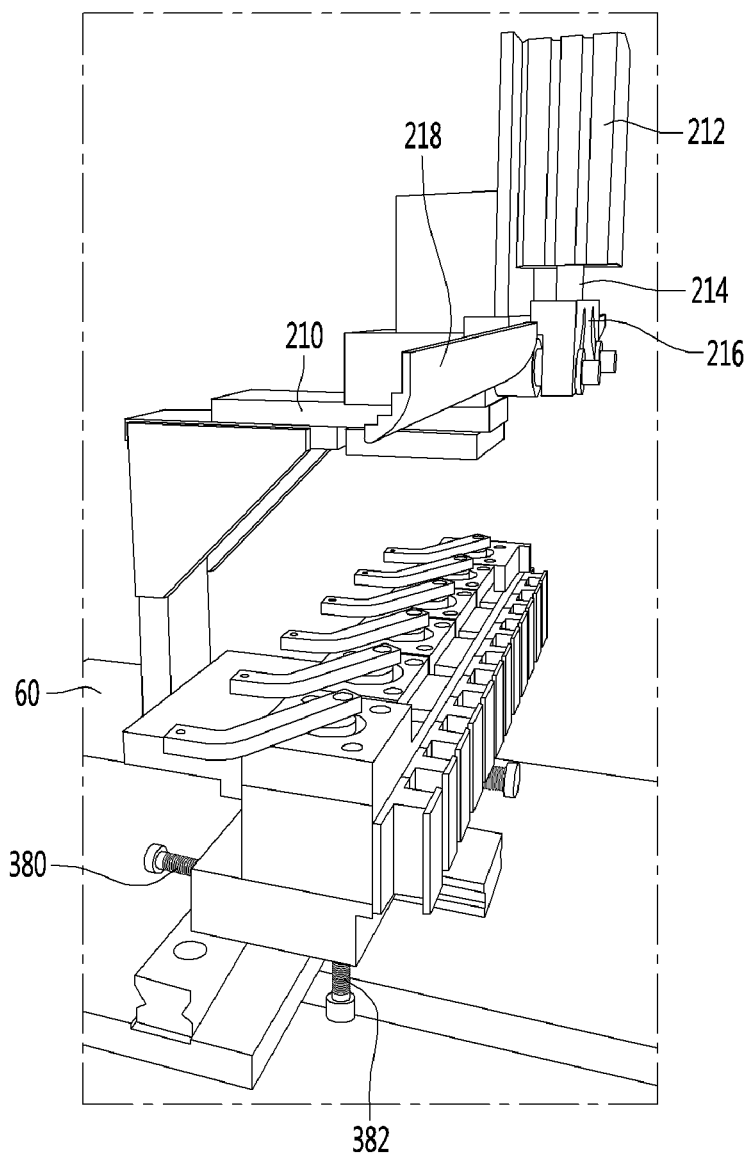
FIGS. 11 to 13 are perspective views showing a configuration and an operation of a winding guide unit of the stator coil winding machine according to the present invention.
Figure 12:
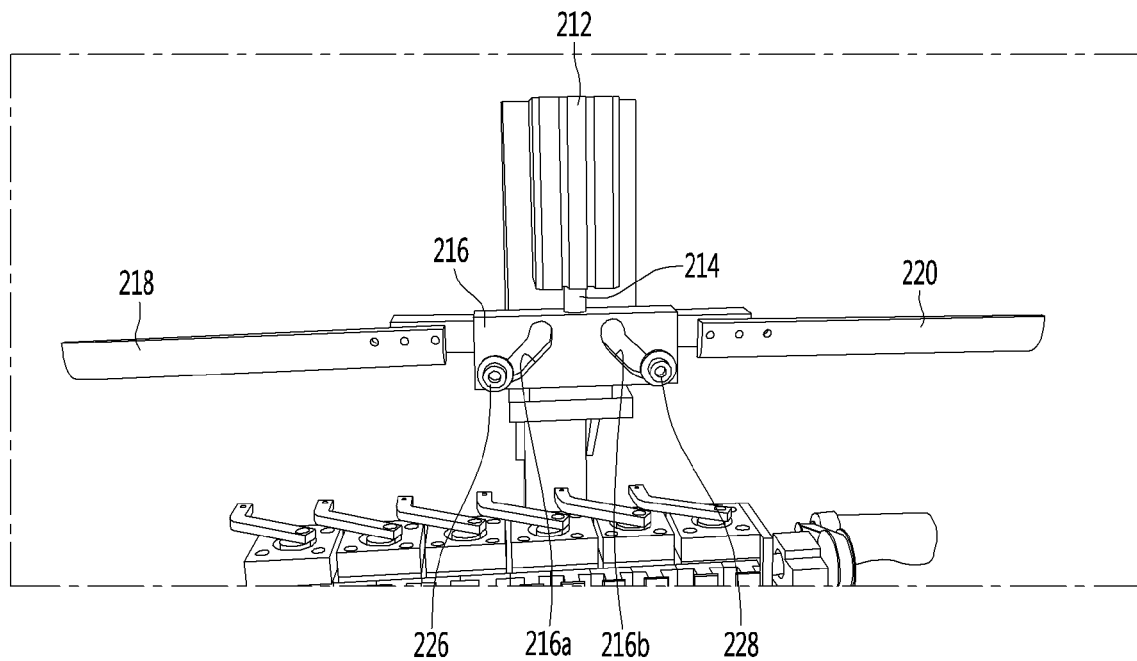
Figure 13:
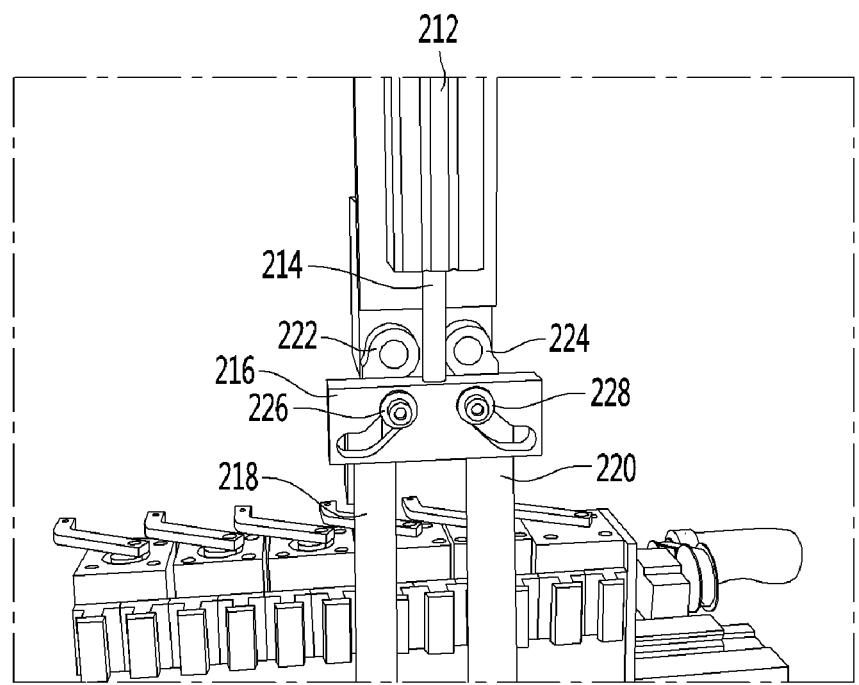
Figure 14:
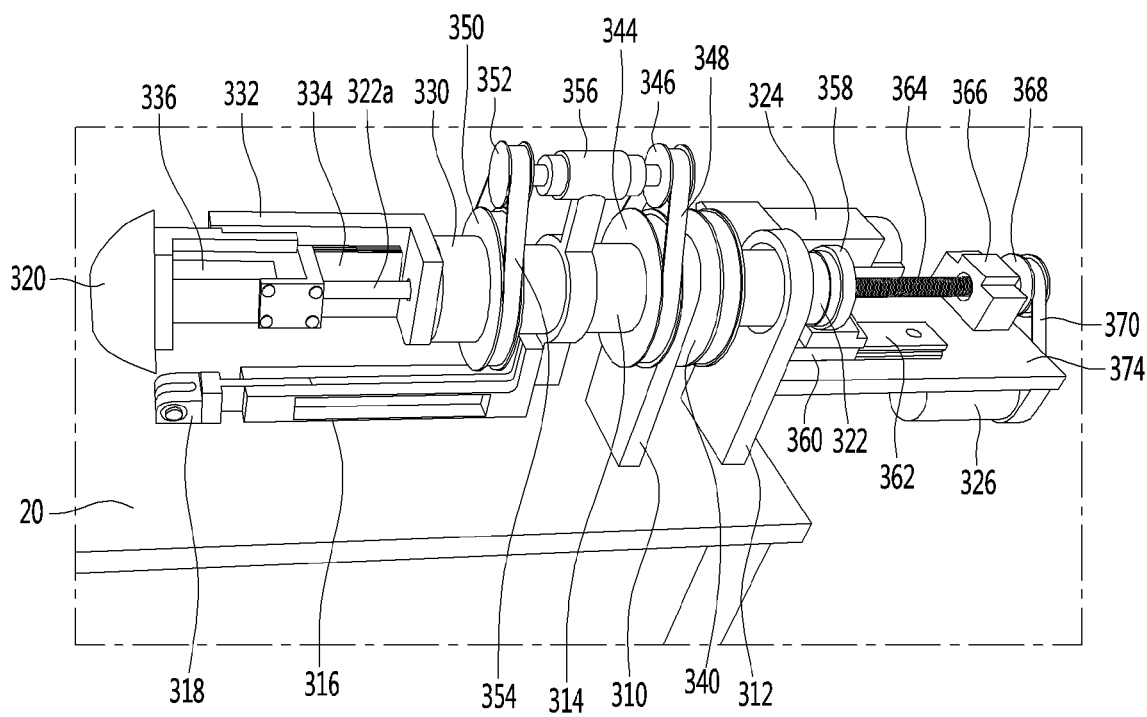
FIGS. 14 to 17 are perspective views showing a configuration and an operation of a winding unit of the stator coil winding machine according to the present invention.
Figure 15:
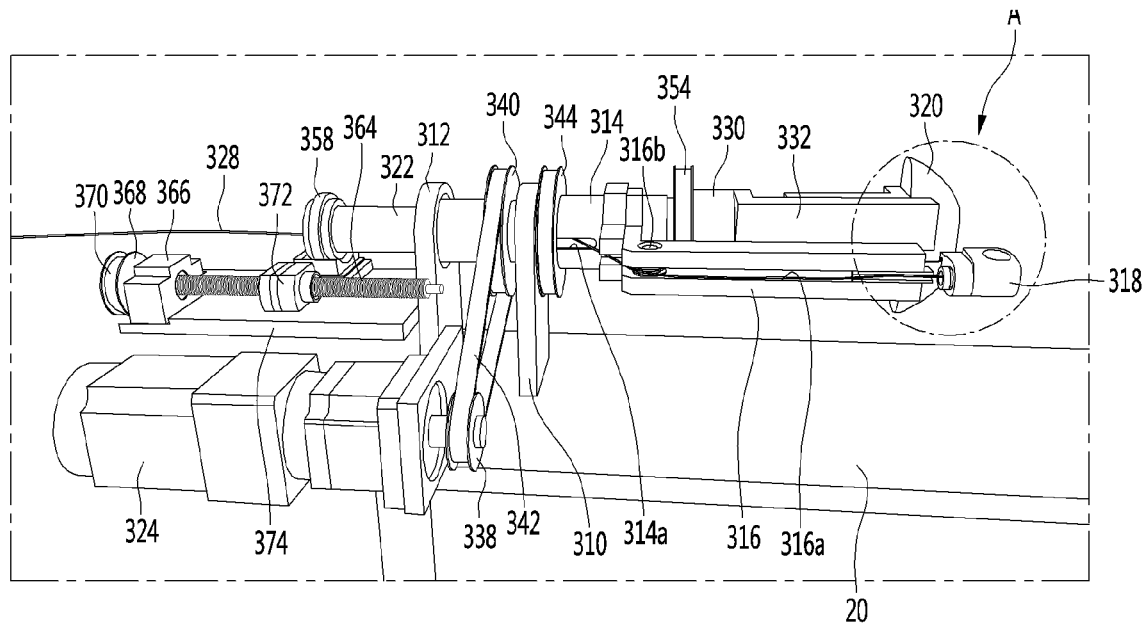

FIGS. 11 to 13 are perspective views showing a configuration and an operation of the winding guide unit of the stator coil winding machine according to the present invention.

The winding guide unit 200 includes a guide driving part 212 located on a support 210 fixed to the plate 60 of the stator fixing part 40 and having a moving shaft 214 located in a downward direction (that is, toward the stator 10 located thereunder), guide members 218 and 220 adapted to guide the coil in such a manner as to prevent, if the coil is wound on any one stator core 11 by means of the winding unit 300, the coil from being locked onto other stator cores 11, guide member rotary shafts 222 and 224 connected to the guide members 218 and 220 to control the rotations of the guide members 218 and 220, and a guide locking part 216 located on the lower end periphery of the moving shaft 214 in such a manner as to move up according to the ascending movement of the moving shaft 214 to allow open and closed states of the guide members 218 and 220 to be kept.

In this case, the guide driving part 212 is spaced apart from the stator 10 on the stator transfer unit 100 above the stator 10 and has the moving shaft 214 located in the downward direction. For example, the guide driving part 212 is desirably constituted of a pneumatic cylinder. The guide driving part 212 moves the guide locking part 215 to allow the guide members 218 and 220 to be open and closed.

The guide member 218 is connected to the guide member rotary shaft 222, and the guide member 220 to the guide member rotary shaft 224. Desirably, the guide members 218 and 220 have a given radius of curvature (for example, R15 mm) to guide the coil when the coil is wound on the stator cores 11, so that the coil is wound well on the corresponding stator core 11, without any damage.

The guide locking part 216 has stoppers 226 and 228 adapted to maintain the open states of the guide members 218 and 220 at the open states of the guide members 218 and 220 and to maintain the closed states of the guide members 218 and 220 at the closed states of the guide members 218 and 220.

Further, the guide locking part 216 has space portions 216a and 216b formed to a given shape to move the stoppers 226 and 228 therealong.

The space portions 216a and 216b are curvedly formed at centers thereof, and the tops and bottoms of the space portions 216a and 216b have different radiuses of curvature from the radiuses of curvature of the centers thereof. In detail, the stopper 226 moves along the space portion 216a, and the stopper 228 moves along the space portion 216b.

If the stoppers 226 and 228 are located on the bottoms of the space portions 216a and 216b, as shown in FIG. 12, the guide members 218 and 220 become open, so that they are prevented from moving upward. In the open states of the guide members 218 and 220, like this, the stator 10 can move to the directions of the X and/or Y axis.

Contrarily, if the stoppers 226 and 228 are located on the tops of the space portions 216a and 216b, as shown in FIG. 13, the guide members 218 and 220 become closed, so that they are prevented from being open. In the closed states of the guide members 218 and 220, like this, the coil can be wound on the stator cores 11.

The tops and bottoms of the space portions 216a and 216b serve as locking grooves, and if a smaller external force than a pressure of the guide driving part 212 (the pneumatic cylinder) is applied to the stoppers 226 and 228, the stoppers 226 and 228 do not escape from the tops and bottoms of the space portions 216a and 216b.

FIGS. 14 to 17 are perspective views showing a configuration and an operation of the winding unit of the stator coil winding machine according to the present invention.

The winding unit 300 includes a rotary shaft 314 located in the longitudinal direction (that is, in the direction of the X axis) of the fixed frame 20 in such a manner as to pass through supports 310 and 312 spaced apart from each other on the fixed frame 20, a rotary arm 316 fixed to the rotary shaft 314 to the form of '¬' and having a nozzle 318 located on an end thereof in such a manner as to allow a coil 328 to be drawn therefrom, a moving shaft 322 adapted to pass through an interior of the rotary shaft 314 in such a manner as to move in the longitudinal direction (that is, in the direction of the X axis) of the fixed frame 20, a moving screw 364 adapted to move the moving shaft 322 in the direction of the X axis, a third motor 324 for generating a force for rotating the rotary shaft 314, a fourth motor 326 for generating a force for rotating the moving shaft 322, a rotary force transfer part for transferring a rotary force to the rotary shaft 314, a moving force transfer part for transferring a moving force to the moving shaft 322, and a winding inducing part located on a fixing part 330 provided on one side periphery of the rotary shaft 314 to induce the coil 328 so that the coil 328 is wound on the stator 10.

In this case, the rotary shaft 314 is spaced apart from the stator 10 above the fixed frame 20 in the direction of the X axis.

The fixing part 330 supports the winding inducing part, while being fixed, without any rotation.

The coil 328 is introduced into the rotary shaft 314 and the moving shaft 322, and next, the introduced coil 328 is introduced into the rotary arm 316 through a hole 314*a* formed on the rotary shaft 314.

The rotary arm 316 has a coil guide groove 316*a* formed thereon, and the coil 328 introduced into the rotary arm 316 moves along the coil guide groove 316*a* and thus passes through the nozzle 318. In this case, the rotary arm 316 has an idler 316*b* located on a portion of the coil guide groove 316*a* where the coil 328 is initially introduced to allow the coil 328 to move along the coil guide groove 316*a*, without any interference. Through the formation of the idler 316*b*, accordingly, the coil 328 introduced into the rotary arm 316 can move to the nozzle 318, without any damage. Further, the nozzle 318 has an idler 318*a* located on an end thereof to allow the coil 328 to move therealong, without any interference.

The rotary force transfer part includes a fifth pulley 338 located on a motor shaft of the third motor 324, a sixth pulley 340 located on the rotary shaft 314, a rubber belt 342 wound on the fifth pulley 338 and the sixth pulley 340, a seventh pulley 344 spaced apart from the sixth pulley 340 on the rotary shaft 314, an eighth pulley 350 spaced apart from the seventh pulley 344 on the rotary shaft 314, a T-shaped pulley connector 356 located between the seventh pulley 344 and the eighth pulley 350 in such a manner as to be fixed to the rotary shaft 314, ninth and tenth pulleys 346 and 352 located on both side ends of the pulley connector 356, respectively, a rubber belt 348 wound on the seventh pulley 344 and the ninth pulley 346, and a rubber belt 354 wound on the eighth pulley 350 and the tenth pulley 352.

The moving force transfer part includes an eleventh pulley 368 located on one end of the moving screw 364 passing through a support 366 fixed on a stand 374 in such a manner as to be connected to a pulley (not shown) located on a motor shaft of the fourth motor 326 through a rubber belt 370, a moving interlocking member 372 spaced apart from the base 374 above the base 372 in such a manner as to be interlocked with the moving screw 364, a sliding guide 362 spaced apart from the moving screw 364 in such a manner as to be fixed to the base 374 in a longitudinal direction (that is, in the direction of the X axis) of the base 374, and a moving shaft moving member 358 fixed to one side of the moving shaft 322 and the moving interlocking member 372 in such a manner as to be slidably connected to the sliding guide 362 to thus move along the sliding guide 362 in the longitudinal direction (that is, in the direction of the X axis).

The winding inducing part includes a support 332 located on the fixing part 330, a sliding guide 334 fixed to one side surface of the support 332, a sliding member 336 moving along the sliding guide 334 in the longitudinal direction (that is, in the direction of the X axis) in such a manner as to allow one end thereof to be connected to an end portion 332*a* of the moving shaft 322, and an inducing member 329 located on the other end of the sliding member 336 in such a manner as to allow the coil 328 drawn from the nozzle 318 to be wound on the stator 10.

As the moving shaft 322 moves in the direction of the X axis, in this case, the end portion 332*a* of the moving shaft 322 passes through the fixing part 330 in the interior of the rotary shaft 314 and thus moves in the direction of the X axis.

The inducing member 320 faces the stator 10, and in this case, a length (vertical length) of the side surface of the inducing member 320, which is close to the stator 10, is shorter than a length (vertical length) of the side surface of the inducing member 320, which is distant from the stator 10. Further, top and underside of the inducing member 320 are rounded. As a result, coil winding can be more gently carried out.

Figure 16:
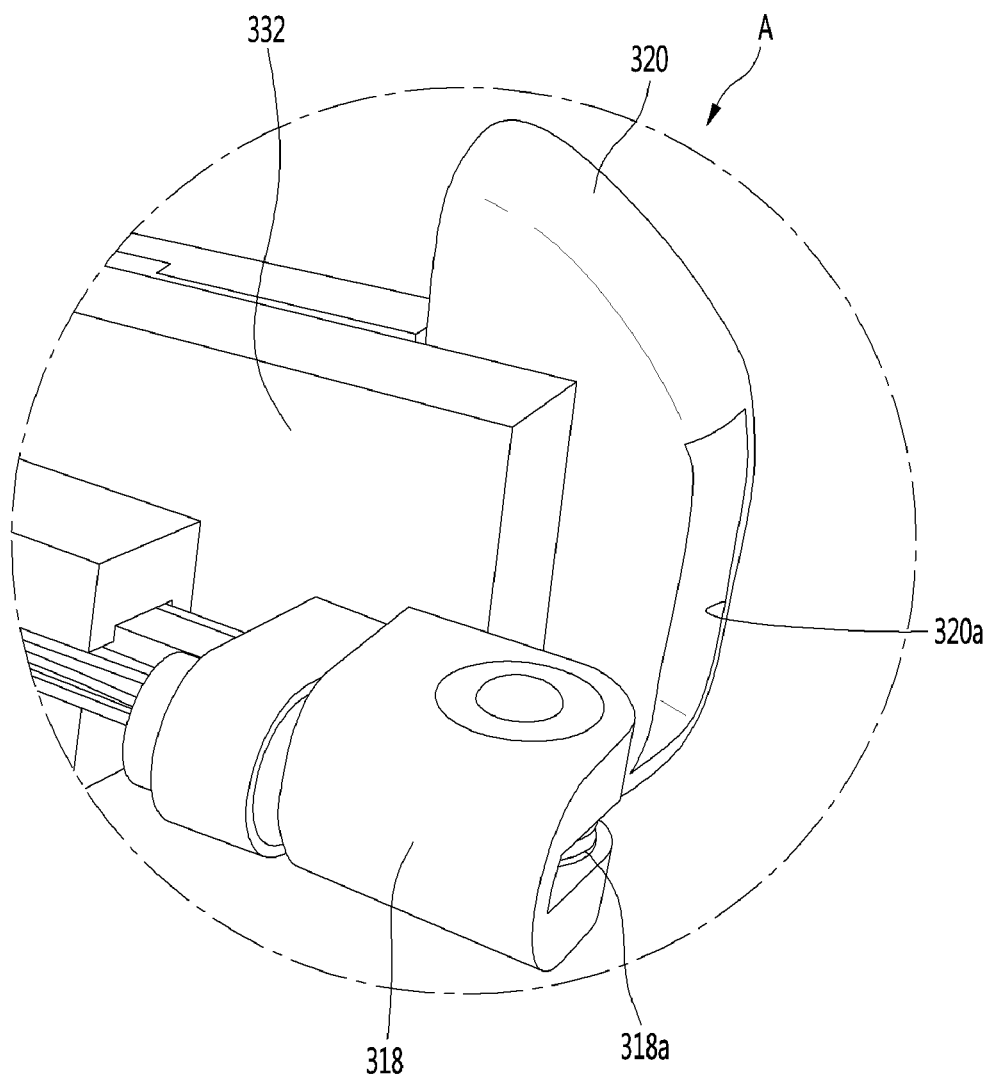

Furthermore, as shown in FIG. 16, the inducing member 320 has an insertion groove 320*a* formed on the side surface close to the stator 10 to insert the stator core 11 thereinto.

The inducing member 320 is spaced apart from the nozzle 318.

Under the above-mentioned configuration, the winding unit 300 operates as follows.

If the stator 10 moves in the directions of the X and Y axes and is thus transferred to the coil winding region by means of the stator transfer unit 100, the moving screw 364 rotates by means of the fifth motor 326 and the moving force transfer part to allow the moving shaft 322 to move in the direction of the X axis. Accordingly, the inducing member 320 moves in the direction of the X axis so as to be close to the stator core 11 on which the coil 328 is wound.

Figure 17:
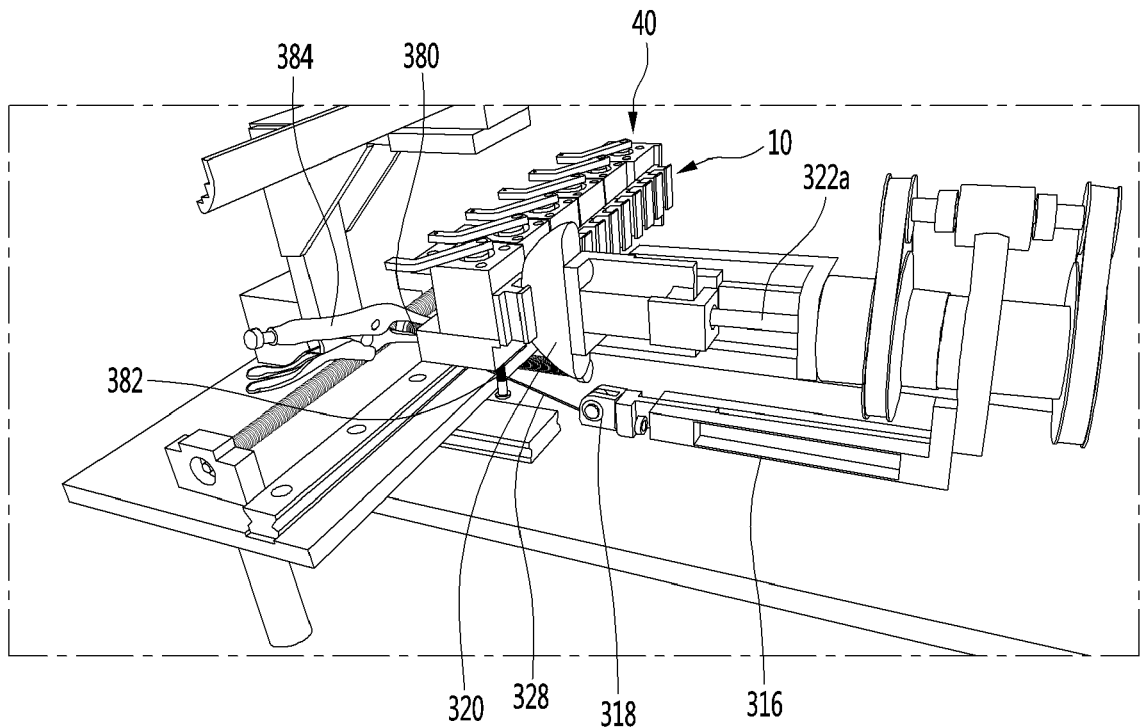

Through the movement of the inducing member 320 in the direction of the X axis, as shown in FIG. 17, the stator core 11 corresponding to coil winding order is inserted into the insertion groove 320*a* of the inducing member 320.

After that, the coil 328 is wound on the coil fixing member 380 or 382 by a worker and is then fixed thereto through a tool 384 so as to prevent loosening. As shown in FIG. 17, in detail, the coil 328 is wound on the coil fixing member 380 and is then locked onto the coil fixing member 382. So as to allow the coil 328 to be wound on the stator 10, the coil 328 has to be wound by a given length on the coil fixing member 380 or 382.

Next, the third motor 324 operates to allow the rotary force transfer part to supply the rotary force to the rotary shaft 314. Accordingly, the rotary shaft 314 rotates, and also, the rotary arm 316 fixed to the rotary shaft 314 rotates.

As the rotary arm 316 rotates, the coil 328 drawn from the nozzle 318 comes into contact with the outer side surface of the inducing member 320 and is thus wound on the corresponding stator core 11.

In this case, the rotary arm 316 rotates in a clockwise or counterclockwise direction with respect to the stator core 11, which is dependent on the winding sequence.

Figure 18:
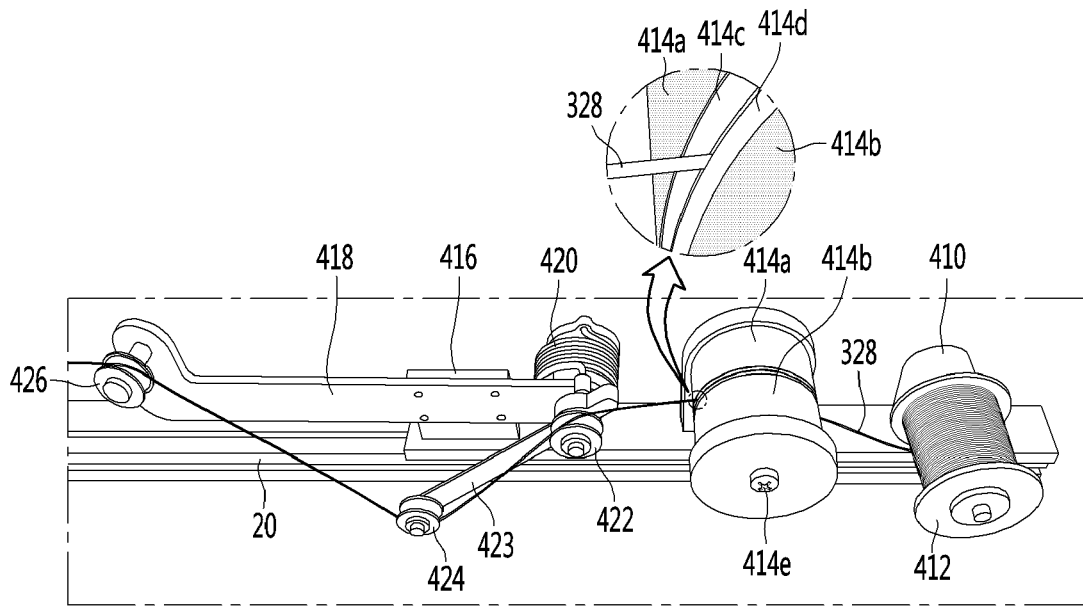
FIG. 18 is a perspective view showing a configuration and an operation of a tension adjusting unit of the stator coil winding machine according to the present invention.

FIG. 18 is a perspective view showing a configuration and an operation of the tension adjusting unit of the stator coil winding machine according to the present invention.

The tension adjusting unit 400 serves to adjust the tension on the coil 328 drawn from a bobbin 412 and then supplied to the winding unit 300, that is, to adjust the tension on the coil 328 wound on the stator 10.

In this case, the bobbin 412 is located at the rearmost end of the fixed frame 20 in such a manner as to be rotatably supported against a support 410.

The tension adjusting unit 400 include a friction part 414 located on the fixed frame 20 in front of the bobbin 412 in such a manner as to continuously apply friction to the coil 328 drawn from the bobbin 412 to allow given tension to be applied to the coil 328 upon coil winding and a tension maintaining part located on the fixed frame 20 in front of the friction part 414 in such a manner as to tighten the tension on the coil 328 instantly released upon the coil winding to allow the tension on the coil 328 to be kept.

The friction part 414 includes two rubber cylinders 414a and 414b coming into surface contact with each other, two plastic plates 414c and 414d coming into close contact with one surface of the two rubber cylinders 414a and 414b, respectively, while passing the coil 328 through a space therebetween, and an adjusting member 414e for adjusting a tension value on the coil 328.

In this case, the adjusting member 414e is constituted of a bolt. The thicker the coil 328 is, the stronger the tension is, so that upon the coil winding, the coil 328 can be prevented from being bent.

The tension maintaining part includes a torsion spring 420 spaced apart from the friction part 414 by a given distance on the fixed frame 20, a lever 423 having a given length connected to the torsion spring 420, and first and second idlers 422 and 424 located on both ends of the lever 423, respectively.

Under the above-mentioned configuration, the tension maintaining part is located on one end of a support 418 having a given length fixed to the fixed frame 20 by means of a support 416. Further, the tension maintaining part has a third idler 426 located on the other end of the support 418 in such a manner as to induce the coil 328 on which the tension is maintained to the winding unit 300.

As a result, the coil 328 drawn from the bobbin 412 passes through the space between the two plastic plates 414c and 414d of the friction part 414, moves to the first and second idlers 422 and 424, and enters the winding unit 300 via the third idler 426.

Figure 19:
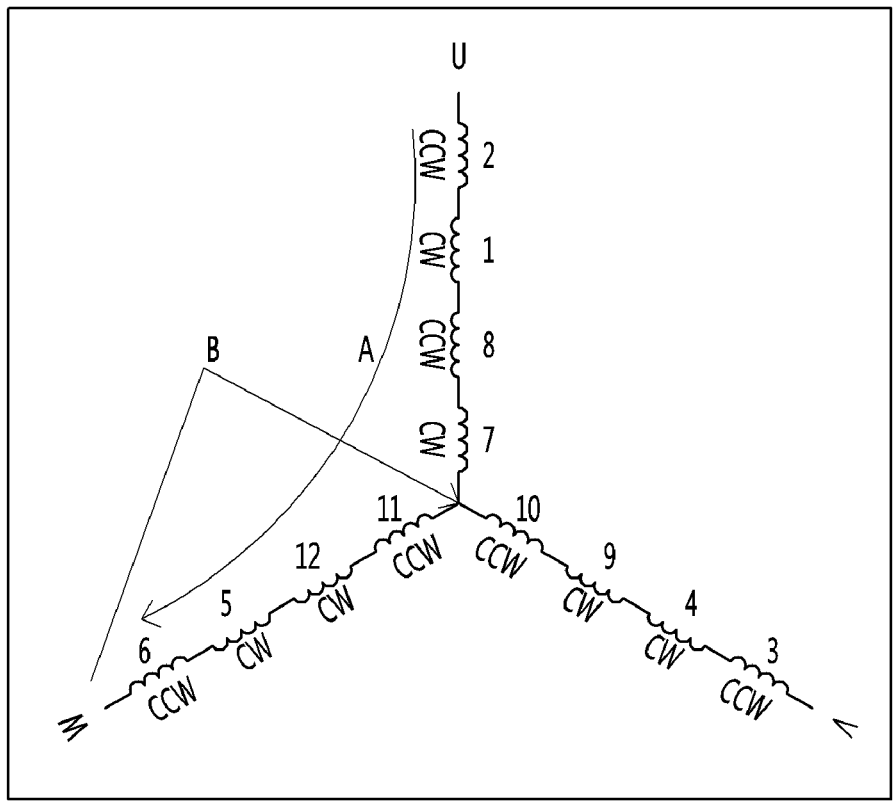
FIG. 19 is a connection diagram showing the stator of the stator coil winding machine according to the present invention.
Figure 20:
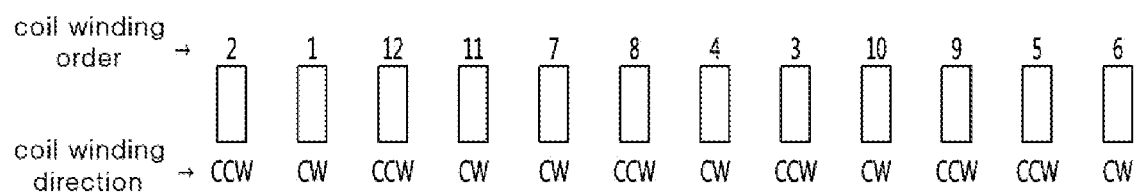
FIG. 20 is a diagram showing a winding sequence in the stator coil winding machine according to the present invention.

FIG. 19 is a connection diagram showing the stator of the stator coil winding machine according to the present invention, and FIG. 20 is a diagram showing the winding sequence in the stator coil winding machine according to the present invention.

The present invention relates to coil winding on the stator used for the BLDC motor adopting the three-phase Y connection. Under stator coil winding conditions, according to the present invention, the tension on the coil upon the coil winding on the stator has to be prevented from being released, and the coil has to be wound on the 12 stator cores 11 in order of coil winding at a time, without any coil cutting. Further, a passing coil, a three-phase coil, and a neutral coil have to be located on one surface, and respective U-V-W phases have to be adjacent to one another.

Accordingly, U includes 1, 2, 7, and 8, V includes 3, 4, 9, and 10, and W includes 5, 6, 11 and 12.

The coil winding state of the stator according to the present invention is suggested as shown in FIG. 19.

In this case, if it is assumed that the 12 stator cores 11 of the stator 10 (See FIG. 2) are called first to twelfth stator cores 11 in a direction of a right side of the stator 10 from a left side thereof, a winding sequence in which coil winding order of the stator cores and coil winding directions thereof are contained is suggested as shown in FIG. 20.

In detail, the coil winding order of the first stator core is the second and the coil winding direction thereof is a counterclockwise (CCW) direction. The coil winding order of the second stator core is the first and the coil winding direction thereof is a clockwise (CW) direction. The coil winding order of the third stator core is the twelfth and the coil winding direction thereof is the counterclockwise (CCW) direction. The coil winding order of the fourth stator core is the eleventh and the coil winding direction thereof is the clockwise (CW) direction. The coil winding order of the fifth stator core is the seventh and the coil winding direction thereof is the clockwise (CW) direction. The coil winding order of the sixth stator core is the eighth and the coil winding direction thereof is the counterclockwise (CCW) direction. The coil winding order of the seventh stator core is the fourth and the coil winding direction thereof is the clockwise (CW) direction. The coil winding order of the eighth stator core is the third and the coil winding direction thereof is the counterclockwise (CCW) direction. The coil winding order of the ninth stator core is the tenth and the coil winding direction thereof is the clockwise (CW) direction. The coil winding order of the tenth stator core is the ninth and the coil winding direction thereof is the counterclockwise (CCW) direction. The coil winding order of the eleventh stator core is the fifth and the coil winding direction thereof is the counterclockwise (CCW) direction. The coil winding order of the twelfth stator core is the sixth and the coil winding direction thereof is the clockwise (CW) direction.

The winding sequence as mentioned above is previously stored in the controller 500.

After the coil has been wound on the 12 stator cores 11 through the winding sequence as mentioned above, on the other hand, the polarities of the stator cores 11 are suggested in the following Table 1.

TABLE 1

| U-V | N | S | N | S | — | — | S | N | S | N | — | — |
| U-W | N | S | — | — | S | N | S | N | — | — | N | S |
| W-V | — | — | N | S | N | S | — | — | S | N | S | N |

If necessary, of course, the coil winding directions of the respective stator cores may be changed to the opposite directions to the above-mentioned directions. In detail, the coil winding direction of the first stator core is the clockwise (CW) direction, the coil winding direction of the second stator core is the counterclockwise (CCW) direction, the coil winding direction of the third stator core is the clockwise (CW) direction, the coil winding direction of the fourth stator core is the counterclockwise (CCW) direction, the coil winding direction of the fifth stator core is the counterclockwise (CCW) direction, the coil winding direction of the sixth stator core is the clockwise (CW) direction, the coil winding direction of the seventh stator core is the counterclockwise (CCW) direction, the coil winding direction of the eighth stator core is the clockwise (CW) direction, the coil winding direction of the ninth stator core is the counterclockwise (CCW) direction, the coil winding direction of the tenth stator core is the clockwise (CW) direction, the coil winding direction of the eleventh stator core is the clockwise (CW) direction, and the coil winding direction of the twelfth stator core is the counterclockwise (CCW) direction. In this case, also, the tension on the coil has to be prevented from being released in order of coil winding of the respective stator cores.

Figure 21:
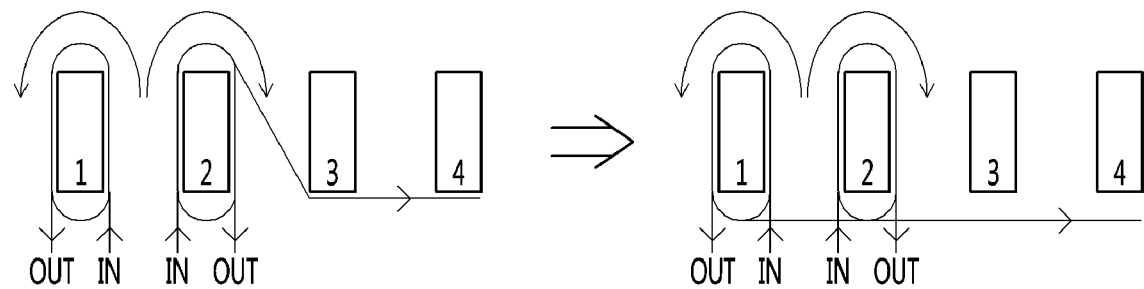
FIG. 21 is a diagram showing a winding sequence principle adopted in the stator coil winding machine according to the present invention.

FIG. 21 is a diagram showing a winding sequence principle adopted in the stator coil winding machine according to the present invention.

If it is assumed that the fourth stator core has to be wound after the first stator core and the second stator core have been wound in order mentioned, as shown on the left side of FIG. 21, the coil may move to the fourth stator core, while undesirably coming into direct contact with the third stator core.

Even if the third stator core is not in order of coil winding, in detail, the coil passes through the third stator core, while coming into contact therewith, so that a shape of the coil wound on the fourth stator may be different from the shape of the coil wound on the first and second stator cores.

So as to avoid the above-mentioned problem, the present invention is configured to allow the coil to be first wound on the second stator core, as shown on the right side of FIG. 21. If coil winding starts on the second stator core, the coil does not come into contact with the third stator core at the time when the coil is wound on the fourth stator core after wound on the first stator core.

Figure 22A:
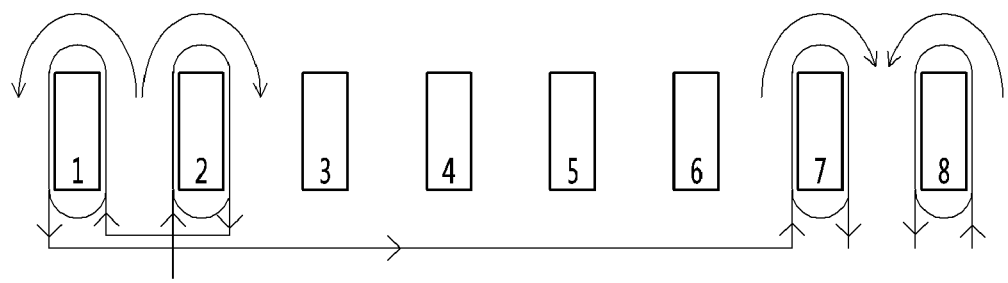
FIGS. 22A and 22B are diagrams showing a state where tension is kept if coil winding is carried out through the winding sequence according to the present invention.
Figure 22B:
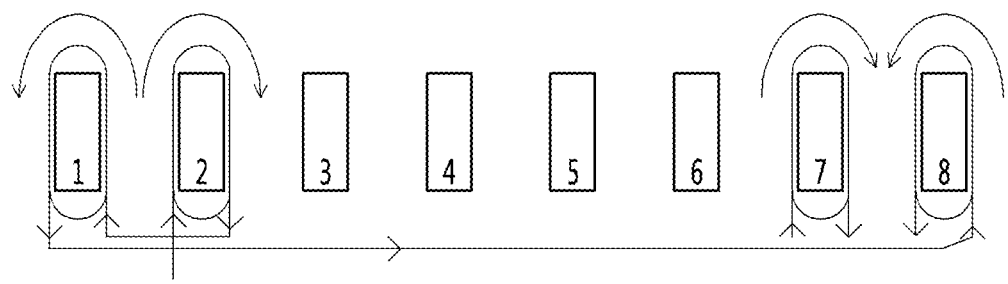

FIGS. 22A and 22B are diagrams showing a state where tension is kept if coil winding is carried out through the winding sequence according to the present invention.

As shown in FIG. 22A, if the coil is wound on the seventh stator core in the clockwise (CW) direction after it has been first wound on the second stator core and next on the first stator core, the tension on the coil becomes released.

Contrarily, as shown in FIG. 22B, if the coil is wound on the eighth stator core in the counterclockwise (CCW) direction after it has been first wound on the second stator core and next on the first stator core, the tension on the coil can be kept.

In case of the phase U, accordingly, if the coil is wound in order of the second stator core (in the clockwise direction), the first stator core (in the counterclockwise direction), the eighth stator core (in the counterclockwise direction), and the seventh stator core (in the clockwise direction), it can be wound, while maintaining the tension thereon.

In case of the phase V (3, 4, 9 and 10) and the phase W (5, 6, 11, and 12), also, the coil can be wound under the above-mentioned winding sequence, while maintaining tension thereon. In case of the phase V, in detail, if the coil is wound in order of the tenth stator core (in the counterclockwise direction), the ninth stator core (in the clockwise direction), the fourth stator core (in the clockwise direction), and the third stator core (in the counterclockwise direction), it can be wound, while maintaining the tension thereon. In case of the phase W, further, if the coil is wound in order of the eleventh stator core (in the counterclockwise direction), the twelfth stator core (in the clockwise direction), the fifth stator core (in the clockwise direction), and the sixth stator core (in the counterclockwise direction), it can be wound, while maintaining the tension thereon.

Like this, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure.

While the present invention has been described with reference to the particular illustrative embodiments, it is not to be restricted by the embodiments but only by the appended claims. However, it should be understood that the invention covers all the modifications, equivalents, and replacements within the idea and technical scope of the invention.

The invention claimed is:

1. A stator coil winding machine comprising:
   a stator transfer unit adapted to transfer a linear type stator having a plurality of stator cores in directions of X and Y axes;
   a winding guide unit adapted to guide a transferred linear type stator to a coil winding;
   a winding unit adapted to wind a coil on the stator;
   a tension adjusting unit adapted to adjust a tension on the coil being wound on the linear type stator; and
   a controller adapted to control operations of the stator transfer unit, the winding guide unit, and the winding unit to allow the coil to be wound on the linear type stator by means of three-phase Y connection on a basis of a previously set winding sequence,
   wherein the previously set winding sequence comprises coil winding order of the plurality of stator cores and coil winding directions of the plurality of stator cores, and when identifying numbers are applied sequentially to the plurality of stator cores in a direction of a right side of the plurality of stator cores from a left side of the plurality of stator cores, the order of coil winding on the plurality of stator cores is different from the identifying numbers of the plurality of stator cores, the plurality of stator cores being divided into three sets so that the coil is wound on the plurality of stator cores by means of the three-phase Y connection.

2. The stator coil winding machine according to claim 1, wherein the linear type stator comprises 12 stator cores, and the previously set winding sequence is carried out as follows: when the identifying numbers are applied sequentially to the plurality of stator cores in the direction of the right side of the plurality of stator cores from the left side of the plurality of stator cores, the coil winding order of a first stator core is second and the coil winding direction thereof is a counterclockwise direction; the coil winding order of a second stator core is first and the coil winding direction thereof is a clockwise direction; the coil winding order of a third stator core is twelfth and the coil winding direction thereof is the counterclockwise direction; the coil winding order of a fourth stator core is eleventh and the coil winding direction thereof is the clockwise direction; the coil winding order of a fifth stator core is seventh and the coil winding direction thereof is the clockwise direction; the coil winding order of a sixth stator core is eighth and the coil winding direction thereof is the counterclockwise direction; the coil winding order of a seventh stator core is fourth and the coil winding direction thereof is the clockwise direction; the coil winding order of an eighth stator core is third and the coil winding direction thereof is the counterclockwise direction; the coil winding order of a ninth stator core is tenth and the coil winding direction thereof is the clockwise direction; the coil winding order of a tenth stator core is ninth and the coil winding direction thereof is the counterclockwise direction; the coil winding order of an eleventh stator core is fifth and the coil winding direction thereof is the counterclockwise direction; and the coil winding order of a twelfth stator core is the and the coil winding direction thereof is the clockwise direction.

3. The stator coil winding machine according to claim 2, wherein in the three-phase Y connection, a first phase is made by a connection of the first stator core, the second stator core, the seventh stator core, and the eighth stator core, a second phase is made by a connection of the third stator core, the fourth stator core, the ninth stator core, and the tenth stator core, and a third phase is made by a connection of the fifth stator core, the sixth stator core, the eleventh stator core, and the twelfth stator core.

4. The stator coil winding machine according to claim 1, wherein when the coil winding on the plurality of stator cores is finished, the linear type stator is transformed into a ring type stator and is thus applied to a brushless DC (BLDC) motor adopting the three-phase Y connection.

5. The stator coil winding machine according to claim 1, wherein the controller operates the stator transfer unit to transfer the stator to a coil winding region, controls a guide operation of the winding guide unit, and controls the coil winding on the plurality of stator cores by means of the winding unit.

6. The stator coil winding machine according to claim 5, wherein after the coil winding on the stator is finished, the controller controls the stator transfer unit, the winding guide unit, and the winding unit to return the stator to an initial position.

7. A stator coil winding machine comprising:
a stator transfer unit adapted to transfer a linear type stator having a plurality of stator cores in directions of X and Y axes;
a winding guide unit adapted to guide a transferred linear type stator to coil winding;
a winding unit adapted to wind a coil on the stator;
a tension adjusting unit adapted to adjust a tension on the coil being wound on the linear type stator; and
a controller adapted to control operations of the stator transfer unit, the winding guide unit, and the winding unit to allow the coil to be wound on the linear type stator by means of three-phase Y connection on a basis of a previously set winding sequence,
wherein the stator transfer unit comprises: an X axis controlling screw located on a fixed frame in the direction of the X axis; an X axis controlling guide spaced apart from the X axis controlling screw on the fixed frame in the direction of the X axis; an X axis moving member located on an underside of a moving frame spaced apart from a top of the fixed frame and configured to move in the direction of the X axis along the X axis controlling guide to allow the X axis controlling screw to be rotatably engagingly passed through the X axis moving member; a Y axis controlling screw located on a top of the moving frame in the direction of the Y axis from the X axis controlling screw; a Y axis controlling guide spaced apart from the Y axis controlling screw on the moving frame; a Y axis moving member moving in the direction of the Y axis along the Y axis controlling guide and configured to allow the Y axis controlling screw to be rotatably engagingly passed through the Y axis moving member; and a stator fixing part coupled to a top of the Y axis moving member and configured to fix the stator.

8. The stator coil winding machine according to claim 7, wherein an end of the X axis controlling screw is rotatably press-fitted to a first support located on the fixed frame, and the other end of the X axis controlling screw is rotatably press-fitted to the X axis moving member and is configured to pass through the X axis moving member.

9. The stator coil winding machine according to claim 7, wherein an end of the X axis controlling screw is connected to a first pulley, the first pulley is connected to a second pulley by means of a rubber belt, and the second pulley is connected to a motor shaft of a first motor.

10. The stator coil winding machine according to claim 7, wherein an end of the Y axis controlling screw is rotatably press-fitted to a second support located on the moving frame, and the other end of the Y axis controlling screw is rotatably press-fitted to a third support located on the moving frame.

11. The stator coil winding machine according to claim 7, wherein an end of the Y axis controlling screw is connected to a third pulley, the third pulley is connected to a fourth pulley by means of a rubber belt, and the fourth pulley is connected to a motor shaft of a second motor.

12. The stator coil winding machine according to claim 7, wherein the stator fixing part comprises:
a plurality of magnet modules located serially in the direction of the Y axis on a plate coupled to the top of the Y axis moving member and configured to operate to a stator locking state for fixing the stator and to a stator unlocking state for releasing the fixed state atoll of the stator; and
handles located on each of the magnet modules and configured to rotate the magnet modules to a given angle.

13. The stator coil winding machine according to claim 12, wherein the magnet modules have magnets built in the magnet modules.

14. The stator coil winding machine according to claim 13, wherein when the handles rotate in one direction to allow the magnetic forces on surfaces of the magnet modules facing the stator to be turned on, the magnet modules operate to the stator locking state.

15. The stator coil winding machine according to claim 14, wherein when the handles rotate in the opposite direction to one direction to allow the magnetic forces on the surfaces of the magnet modules facing the stator to be turned off, the magnet modules operate to the stator unlocking state.

16. The stator coil winding machine according to claim 7, wherein the stator fixing part comprises at least one coil fixing member located on a back side and/or an underside of the stator fixing part to fix the coil.

17. A stator coil winding machine comprising:
a stator transfer unit adapted to transfer a linear type stator having a plurality of stator cores in directions of X and Y axes;
a winding guide unit adapted to guide a transferred linear type stator to coil winding;
a winding unit adapted to wind a coil on the stator;
a tension adjusting unit adapted to adjust a tension on the coil being wound on the linear type stator; and
a controller adapted to control operations of the stator transfer unit, the winding guide unit, and the winding unit to allow the coil to be wound on the linear type stator by means of three-phase Y connection on a basis of a previously set winding sequence,
wherein the tension adjusting unit comprises: a friction part adapted to continuously apply a friction to the coil drawn from a bobbin; and a tension maintaining part adapted to tighten the tension on the coil instantly released upon the coil winding to allow the tension on the coil to be kept.

18. The stator coil winding machine according to claim 17, wherein the friction part comprises: two rubber cylinders coming into a surface contact with each other; two plastic plates coming into a close contact with one surface of the two rubber cylinders, respectively, while passing the coil through a space between the two plastic plates; and an adjusting member for adjusting a tension value on the coil.

19. The stator coil winding machine according to claim 18, wherein the adjusting member is constituted of a bolt.

20. The stator coil winding machine according to claim 18, wherein the tension maintaining part comprises: a torsion spring spaced apart from the friction part by a given distance; a lever connected to the torsion spring; and first and second idlers located on both ends of the lever, respectively.

21. The stator coil winding machine according to claim 20, wherein the tension maintaining part is located on one end of a support fixed to the fixed frame on which the tension adjusting unit is located, and a third idler is located on the other end of the support and is configured to induce the coil on which the tension is maintained to the winding unit.

22. The stator coil winding machine according to claim 21, wherein the coil drawn from the bobbin passes through the space between the two plastic plates of the friction part, moves to the first and second idlers, and enters the winding unit via the third idler.

\* \* \* \* \*